(12) United States Patent
Toscano (10) Patent No.: US 11,503,182 B2
(45) Date of Patent: Nov. 15, 2022

(54) METHOD AND SYSTEM FOR SPECIAL PROCESSING OF FAX TRANSMISSIONS

(71) Applicant: j2 Cloud Services, LLC, Los Angeles, CA (US)

(72) Inventor: Francis Toscano, Kendall Park, NJ (US)

(73) Assignee: J2 CLOUD SERVICES, LLC, Los Angeles, CA (US)

( * ) Notice: Subject to any disclaimer, the term of this patent is extended or adjusted under 35 U.S.C. 154(b) by 0 days.

(21) Appl. No.: 17/189,088

(22) Filed: Mar. 1, 2021

(65) Prior Publication Data

US 2022/0279088 A1    Sep. 1, 2022

(51) Int. Cl.
*H04N 1/327* (2006.01)
*H04N 1/32* (2006.01)
*H04N 1/00* (2006.01)

(52) U.S. Cl.
CPC ..... *H04N 1/32708* (2013.01); *H04N 1/00217* (2013.01); *H04N 1/32117* (2013.01); *H04N 1/32475* (2013.01)

(58) Field of Classification Search
USPC ........ 358/402, 407, 515; 379/100.08, 100.01
See application file for complete search history.

(56) References Cited

U.S. PATENT DOCUMENTS

| | | | |
|---|---|---|---|
| 8,639,754 B2 * | 1/2014 | Vendrow ............... | H04L 67/141 709/217 |
| 9,042,532 B2 * | 5/2015 | Watts ................. | H04N 1/33376 379/100.01 |
| 9,734,541 B1 | 8/2017 | Pinsonneault | |
| 10,334,119 B2 | 6/2019 | Freeman | |
| 10,694,067 B2 | 6/2020 | Toscano et al. | |
| 2002/0101620 A1 | 8/2002 | Sharif et al. | |
| 2004/0252349 A1 | 12/2004 | Green | |

(Continued)

FOREIGN PATENT DOCUMENTS

| KR | 1020180124507 A | 11/2018 |
|---|---|---|
| KR | 1020190102763 A | 9/2019 |

OTHER PUBLICATIONS

PCT International Search Report And The Written Opinion Of The International Searching Authority, Or The Declaration for PCT/US2022/026046, dated Aug. 5, 2022, 10 pages.

(Continued)

*Primary Examiner* — Maria El-Zoobi
(74) *Attorney, Agent, or Firm* — Womble Bond Dickinson (US) LLP (57) ABSTRACT

Methods and system are described for special processing of fax transmissions. In one embodiment, an electronic device receives a first searchable electronic document and a fax telephone number. The device determines that the document is to be transmitted as an electronic message based on the number. The device generates a second searchable electronic document from the first document. The device adds an electronic signature to the second document that includes at least one of a timestamp of when the first document was received, a number of pages of the second document, and source device information. The device transmits the electronic message that includes the second document to a destination address according to the number. Other embodiments are also described and claimed.

25 Claims, 4 Drawing Sheets

(56) References Cited

U.S. PATENT DOCUMENTS

| | | |
|---|---|---|
| 2005/0275871 A1 | 12/2005 | Baird et al. |
| 2006/0031364 A1 | 2/2006 | Hamilton et al. |
| 2006/0209333 A1 | 9/2006 | Takida |
| 2008/0104408 A1 | 5/2008 | Mayer |
| 2009/0067418 A1 | 3/2009 | Toscano |
| 2009/0190159 A1* | 7/2009 | Toscano ............... H04N 1/0022 358/1.15 |
| 2010/0060926 A1 | 3/2010 | Smith et al. |
| 2010/0161993 A1 | 6/2010 | Mayer |
| 2010/0208726 A1 | 8/2010 | Oliszewski |
| 2010/0214590 A1 | 8/2010 | Ray et al. |
| 2011/0119088 A1 | 5/2011 | Gunn et al. |
| 2011/0179266 A1 | 7/2011 | Popesco |
| 2011/0310890 A1 | 12/2011 | Yanagi |
| 2012/0212763 A1* | 8/2012 | Honma ................. G06F 3/1285 358/1.13 |
| 2013/0038894 A1 | 2/2013 | Murphy |
| 2013/0096938 A1 | 4/2013 | Stueckemann et al. |
| 2014/0240760 A1 | 8/2014 | Dowling et al. |
| 2014/0268219 A1 | 9/2014 | Ho et al. |
| 2015/0081325 A1 | 3/2015 | Pletcher et al. |
| 2015/0195418 A1 | 7/2015 | Toscano |
| 2015/0234984 A1 | 8/2015 | Singer et al. |
| 2015/0278474 A1 | 10/2015 | Stueckemann et al. |
| 2016/0042483 A1 | 2/2016 | Vo et al. |
| 2016/0342752 A1 | 11/2016 | Stueckemann et al. |
| 2017/0064092 A1 | 3/2017 | Lennstrom |
| 2017/0187731 A1 | 6/2017 | Hatta |
| 2018/0249038 A1 | 8/2018 | Lehavi et al. |
| 2018/0294048 A1 | 10/2018 | Blumenthal et al. |
| 2019/0052770 A1 | 2/2019 | Kamens et al. |
| 2019/0156055 A1 | 5/2019 | Rosenberg et al. |
| 2019/0267123 A1 | 8/2019 | Stueckemann et al. |
| 2019/0356786 A1 | 11/2019 | Freeman |
| 2020/0106923 A1 | 4/2020 | Watts et al. |
| 2020/0327967 A1 | 10/2020 | Tevis et al. |
| 2020/0412887 A1 | 12/2020 | Cichielo et al. |

OTHER PUBLICATIONS

PCT International Search Report and Written Opinion for PCT/US2022/031638, dated Sep. 8, 2022, 10 pages.

* cited by examiner

| Receiving Data | Document Processing Data | Transmitting Data |
|---|---|---|
| Reception Time Stamp | Processing Time Stamp(s) | Transmission Time Stamp |
| Sender's Information | Processing Information | Destination Address(es) |
| Recipient's Information | Updated Document Information | |
| Document Information | | |
| ooo | ooo | ooo |

50

METHOD AND SYSTEM FOR SPECIAL PROCESSING OF FAX TRANSMISSIONS

FIELD

An embodiment of the disclosure is related to a fax system that performs special processing of fax transmissions. Other embodiments are also described.

BACKGROUND

Fax messaging continues to be an important avenue for delivery of secure messages between individuals worldwide despite the proliferation of message delivery services that use the Internet. Traditional fax messaging services require both a dedicated fax machine and a dedicated fax number to receive a fax transmission. Modern fax messaging services have eliminated the requirement for a dedicated fax machine, utilizing the Internet to provide greater flexibility for subscribers of those services to transmit and receive fax messages. For instance, a subscriber of a modern fax messaging service is assigned a direct inward dialing (DID) telephone number, which the subscriber distributes to others who wish to send a fax message to the subscriber. The DID telephone number is in effect the subscriber's individual fax number. When an incoming fax transmission is received at a particular DID telephone number, the fax messaging service generates a fax message from the fax transmission in a format that is suitable for transmission over a data network such as the Internet, and sends the fax message to the subscriber (e.g., to the subscriber's e-mail address).

SUMMARY

Many industries, such as the healthcare industry, use fax to securely transmit documents between healthcare providers (or organizations). For example, a healthcare provider may transmit a fax that includes a patient's medical records to another healthcare provider or to an Electronic Medical record (EMR) system for storage (and later retrieval). To manage incoming faxes, a provider may subscribe to one or more fax services of a fax service provider. For example, a fax service provider may provide subscribers with an e-mail fax service in which incoming fax transmissions that are received over a data network (e.g., the Internet) are routed (or forwarded) to subscribers. In this case, an incoming fax transmission may be in the form of an e-mail that contains a fax file (e.g., a searchable Portable Document Format (PDF) file) as an attachment and is destined to an e-mail server that is managed by the fax service provider. Once the e-mail is received, the fax service provider may add a timestamp (e.g., in order to accurately certify the date of the fax transmission) and convert the PDF file into a suitable format for fax transmission, such as Tagged Image File Format (TIFF), which is a static image. The fax service provider sends the static image to the subscriber, which may be to the subscriber's e-mail address or to a fax telephone number of the subscriber.

As a result of the conversion to a static image, the transmitted fax file does not include searchable text and does not retain any of the formatting features of the original PDF file. This requires the receiving subscriber to perform additional processing upon the image (e.g., performing Optical Character Recognition (OCR) software) to create a separate searchable file. Such additional processing may be time consuming and burdensome to the subscriber. Therefore, there is a need for fax services that performs special processing upon incoming fax transmissions to provide subscribers with searchable documents that also certified in a similar fashion as fax transmissions that are routed as static images.

The instant disclosure is directed to a method performed by a programmed processor of an electronic device (e.g., a fax service provider server) to perform special processing upon incoming fax transmissions. For instance, the device receives, over a computer network and from a source device, a first searchable electronic document and a fax telephone number to which the searchable electronic document is to be routed as a fax transmission. The device determines that the first document is to be transmitted as an electronic message (such as an e-mail) over the computer network based on the fax telephone number. The device generates a second searchable electronic document from the first document. For example, when the first document is in one file format, such as a word processing format, a spreadsheet format, or a presentation format, the device converts the first document into a second file format such as a searchable Portable Document Format (PDF). The device adds an electronic signature to the second document that includes at least one of a timestamp when the first document was received, a number of pages of the second document, and source device information (e.g., an outbound telephone number of the source device). The device transmits, over the computer network, an electronic message (e.g., an e-mail) that includes the second document to a destination address according to the fax telephone number. Thus, healthcare provider subscribers may securely and efficiently transmit and receive searchable electronic documents via fax.

The above summary does not include an exhaustive list of al aspects of the present disclosure. It is contemplated that the disclosure includes all systems and methods that can be practiced from ail suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the disclosure are illustrated by way of example and not by way of limitation in the figures of the accompanying drawings in which like references indicate similar elements. It should be noted that references to "an" or "one" embodiment of the disclosure in this disclosure are not necessarily to the same embodiment, and they mean at least one. Also, a given figure may be used to illustrate the features of more than one embodiment of the disclosure, and not all elements in the figure may be required for a given embodiment.

DETAILED DESCRIPTION

Several embodiments of the disclosure with reference to the appended drawings are now explained. Whenever aspects of the embodiments described here are not explicitly defined, the scope of the disclosure is not limited only to the parts shown, which are meant merely for the purpose of illustration. Also, while numerous details are set forth, it is understood that some embodiments of the disclosure may be practiced without these details. In other instances, well-known circuits, structures, and techniques have not been shown in detail so as not to obscure the understanding of this description.

References in the specification to "one embodiment" or "an embodiment" means that a particular feature, structure, or characteristic described in conjunction with the embodiment can be included in at least one embodiment, but every embodiment may not necessarily include the particular feature, structure, or characteristic. Moreover, such phrases are not necessarily referring to the same embodiment.

Figure 1:
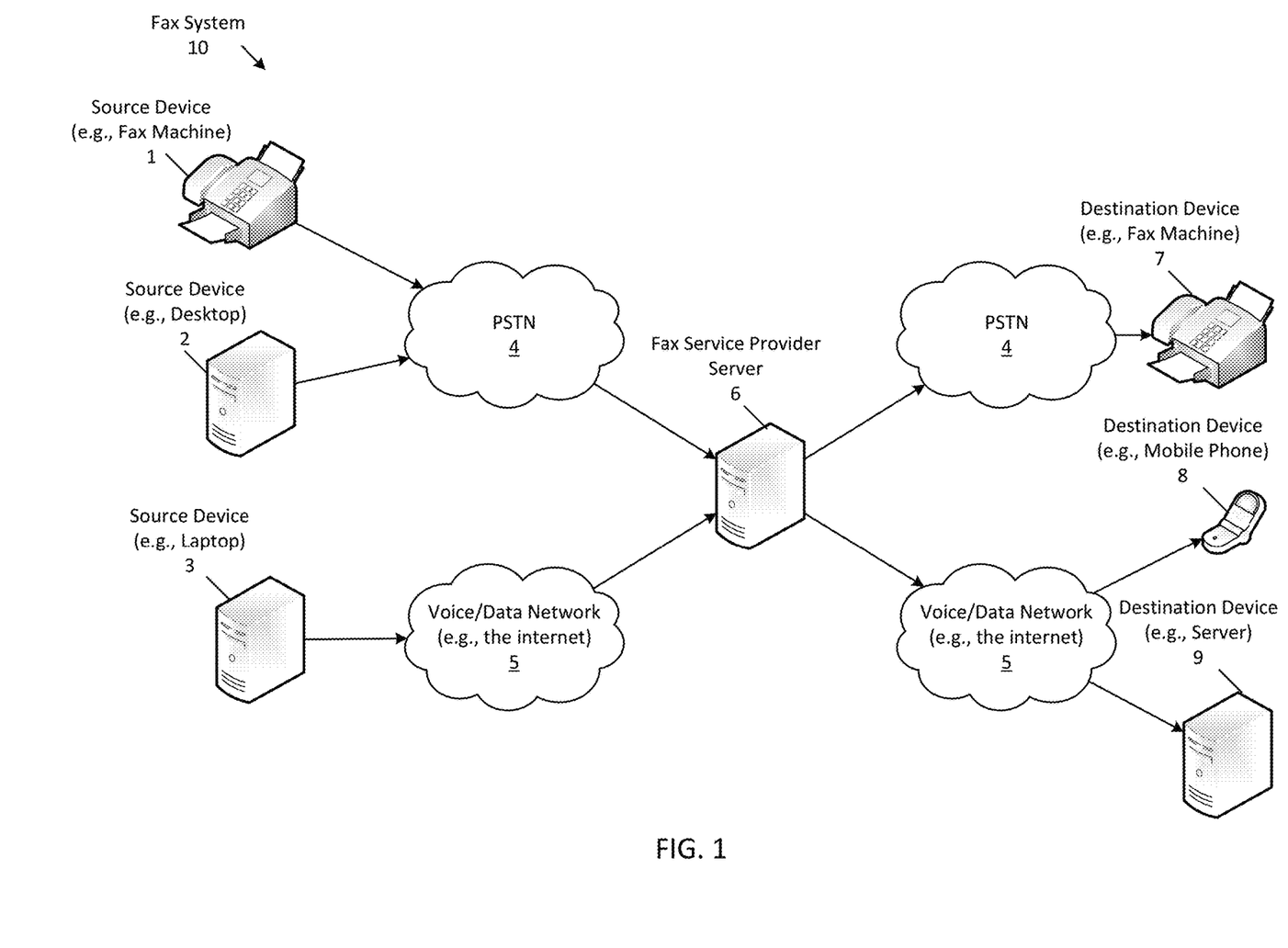
FIG. 1 is a block diagram illustrating a fax system, according to some embodiments.

FIG. 1 is a block diagram illustrating a fax (service provider) system 10, according to some embodiments. The fax system 10 includes three source (or originating) devices 1-3, a Public Switched Telephone Network (PSTN) 4, a voice/data (e.g., computer) network (e.g., the Internet) 5, one or more fax service provider servers (e.g., fax server(s) or electronic device(s)) 6, and three destination devices 7-9. In one embodiment, the system may include more or less (e.g., source, destination, etc.) devices.

As illustrated, the source devices 1 and 2 are coupled to the server 6 via the PSTN, and the source device 3 is coupled to the server via the computer network. As shown, source device 1 is a fax machine and source device 2 is a desktop computer. In one embodiment, devices 1 and 2 may be any electronic device that are capable of placing outgoing calls and/or receiving incoming (e.g., fax) calls over the PSTN 4 to (and from) the fax service provider server 6. For instance, the fax machine 1 may send a fax transmission through the PSTN 4 using a suitable fax protocol such as the Group 3 protocol defined by the International Telecommunications Union telecommunication Standardization Sector (ITU-T) (e.g., as defined in ITU-T Recommendations T.30 and T.4). A user may operate the fax machine to thus send a fax transmission to a recipient, by for example placing a paper document into the fax machine and entering the phone number of the recipient into the fax machine. The fax machine scans the paper document and converts the contents of the document into an electronic fax format. Alternatively, the machine may convert an electronic document into the electronic fax format. The fax machine places an outgoing call by utilizing Dual-Tone Multi-Frequency (DTMF) signaling. Once the call is answered (e.g., by the server 6), the fax machine transmits the contents of the document, through the PSTN in the form of audio-frequency tones (e.g., a fax tone as per the Group 3 protocol). Once received, the fax transmission may be stored at the server (or more specifically in memory of the server) in a facsimile file format (e.g., tagged image file format (TIFF)). In one embodiment, the desktop 2 may include a dial-up modem and telephony software, which when executed may use the dial-up modem to transmit a fax transmission via the PSTN. Specifically, the software may be configured to receive (e.g., via a Graphical User Interface (GUI) displayed on a display screen coupled to the desktop) a fax telephone number to which a document is to be transmitted. The desktop may convert the document into the suitable fax file format and place an outgoing call using the dial-up modem to establish a dial-up connection with the server 6 via the PSTN. Once established, the desktop may transmit the fax file, as described herein.

The source device 3 is coupled to the server 6 via the computer network 5. As shown, the source device 3 is a laptop computer. In another embodiment, however, device 3 may be any type of device that is capable of transmitting fax transmissions (e.g., as electronic messages) over the computer network to the fax service provider server 6. In particular, the source device 3 may include fax software, which when executed by the device is configured to send fax transmissions as electronic messages that include fax files. As another example, the source device 3 may establish a communication data link (e.g., via an Application Programming Interface (API)) with the fax server 6, and transmit the electronic message over the connection. In another embodiment, the source device may transmit the message to the fax server using any known method. In some embodiments, the source device 3 may be a portable device, such as a mobile phone (or smart phone).

Also shown, the destination device 7 is a fax machine that is coupled to the server 6 via the PSTN. The destination devices 8 and 9 are a mobile phone and (one or more) server(s), respectively, which are coupled to server 6 via the computer network 5. In one embodiment, device 7 may be any electronic device that is capable of sending/receiving fax transmissions over the PSTN, and devices 8 and 9 may be any electronic device that is capable of transmitting/receiving fax transmissions over the computer network 5. More about transmitting and receiving fax transmissions over computer network is described herein.

In one embodiment, the voice/data network 5 may include infrastructure that enables one or more devices to send and receive fax transmissions (e.g., as electronic messages), such as routers, access points, one or more servers, etc. In some embodiments, the network may also include one or more cell towers, all of which may be part of a communication network that supports data transmission (and/or voice calls) for mobile devices (e.g., a 4G Long Term Evolution (LTE) network). More about the infrastructure of the network is described herein.

The server 6 is a stand-alone server computer or a cluster of server computers configured to perform one or more fax service provider operations, as described herein. In one embodiment, the server may be a part of a cloud computing system that is capable of performing the fax service provider operations as a cloud-based service. More about these operations is described herein.

Figure 2:
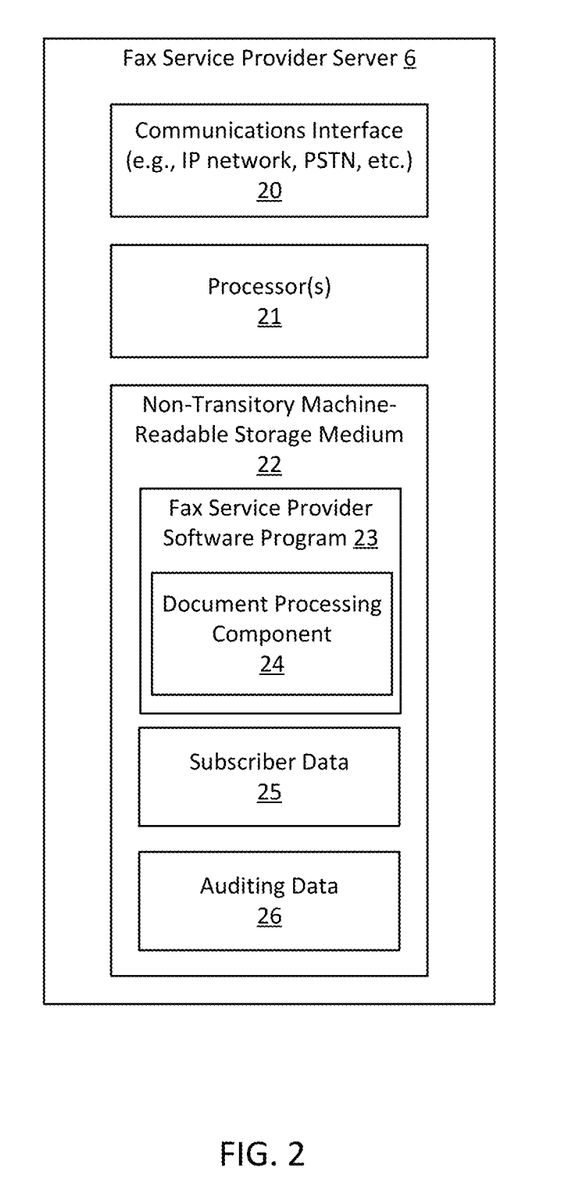
FIG. 2 shows a block diagram illustrating a fax service provider server, according to some embodiments.

FIG. 2 shows a block diagram illustrating the fax service provider server 6, according to some embodiments. The fax server is operated by one or more fax service providers, and is capable of processing fax transmissions destined for subscribers of one or more fax services. Typically, fax services (or more specifically the fax service provider) assigns a different Direct Inward Dialing (DID) telephone number (e.g., fax telephone number) to each subscriber. A subscriber distributes the DID number to others who wish to send a fax message (as an incoming fax transmission) to the subscriber. The DID number is in effect the subscriber's individual fax number. In one embodiment, the fax telephone number is an identifier that is unique to the subscriber. When a sending party sends a fax transmission to the subscriber's DID number (e.g., over the PSTN as described herein), the server receives the fax transmission and generates a fax message from (or decode message content in) the fax transmission. The generated fax message may be in a format that is viewable by the subscriber on an electronic (e.g., destination) device, e.g., PDF, TIFF, etc., and is made available to the subscriber (e.g., for viewing).

In another embodiment, the fax server 6 may receive an incoming fax transmission (e.g., as an electronic message) over the voice/data network 5. For example, a user (e.g., another subscriber or a non-subscriber) may transmit an e-mail over the data network (e.g., Internet) that includes (e.g., as an attachment) a fax file (or transmission). In one embodiment, the fax file may be in a fax suitable format, such as TIFF. In another embodiment, the fax file may be a searchable electronic document, such as a searchable PDF. In some embodiments, the fax file may be in a format that is executable by one or more applications that allows a user to search, add, remove, and/or edit data (e.g., text, images, etc.) in the file. For example, the file may be in a word processing format that is executable by a word processing software application, a spreadsheet format that is executable by a spreadsheet software application, a presentation format that is executable by a presentation application. In one embodiment, the fax file may be in any file format that is searchable.

In one embodiment, the received electronic message may also include an outbound (or recipient) address to which the fax file contained therein is being transmitted. Returning to the previous example, the e-mail may include an e-mail address of a subscriber to which the fax transmission is to be routed by the fax server. To route the fax transmission, the e-mail address may indicate the outbound address and/or identifying information of the subscriber. For example, the outbound address may be the user name of the e-mail address, which may be the DID telephone number that is assigned to the subscriber to which the fax is to routed (e.g., by a fax transmission over the PSTN), and the domain name of the e-mail address may be associated with the fax service provider. Once the e-mail is received, the fax server may be configured to determine how to route the fax transmission based on the e-mail address, or more specifically the user name (e.g., the DID fax telephone number) of the e-mail address. More about routing the fax telephone number is described herein.

Once an incoming fax transmission is received, the fax server 6 may make the fax message available to a subscriber through various means. In one embodiment, the fax server may transmit the fax message to an e-mail address (e.g., a destination address) of the subscriber. In another embodiment, the fax server stores the fax message in a data storage until it is accessed there by the subscriber over the computer network 5. For example, the fax message may remain stored on a web server accessible over the Internet. In another embodiment, a notification is sent to (addressed to) the subscriber that indicates that a new fax message is available, such as a Short Message Service (SMS) message. In one embodiment, the notification may include information on how to access the new message (e.g., an email notification containing a link, such as a Uniform Resource Locator (URL), to the stored fax message). In another embodiment, the notification may be transmitted as any type of electronic message (e.g., a SMS message, a Multimedia Messaging Service (MMS) message, etc.) to a known telephone number associated to the subscriber. In this case, the electronic message may include the information mentioned above, such as a URL. In another embodiment, the messages may include the generated fax message as an attachment.

In another embodiment, the fax server may transmit (e.g., route) an incoming fax transmission that is received from a source device in a similar manner as described herein to one or more destination devices. For instance, the fax server may transmit a fax transmission via the PSTN 4 to a destination device (e.g., device 7). In particular, the fax server may place an outgoing call (e.g., to a fax telephone number associated with a subscriber), and once the call is answered the fax server transmits the fax transmission, as described herein.

In some embodiments, the fax server 6 may transmit (or distribute) an incoming fax transmission (or more specifically the fax file received in the transmission) over a communication data connection with one or more destination devices. In particular, the fax server may be configured to establish, over the computer network 5 and via an API, a communication data connection with a destination device, such as server 9 using a destination address of the server, for example an Internet Protocol (IP) address or a domain name. Once established, the fax server may transmit an electronic message (e.g., as one or more data packets, such as IP packets) that includes the fax transmission (or more specifically the fax file or processed fax file) over the data connection to the destination device. In one embodiment, the fax server may establish a connection via a website that is hosted by (or on) the destination device. In this case, the destination address may be a Uniform Resource Locator (URL), which includes the domain name associated with the destination device. The fax server may establish a data connection to the URL according to any data transfer (application) protocol, such as Hypertext Transfer Protocol (HTTP), File Transfer Protocol (FTP), etc. In some embodiments, the fax server may use any (e.g., Application layer) protocol in the server's protocol stack to establish a connection with a destination device and transmit data (e.g., as one or more data packets).

In some embodiments, the fax server 6 may transmit the electronic message as an e-mail (e.g., a Simple Mail Transfer Protocol (SMTP) message). In this case, the electronic message may be contained (e.g., as text) within the body of the e-mail. In another embodiment, the electronic message may include the fax message (e.g., the electronic document) as an attachment to the e-mail, which is formatted according to the Multipurpose Internet Mail Extensions (MIME) protocol.

In another embodiment, the fax server 6 may establish a secure communication data connection with the destination device. Specifically, the fax server may establish, over the computer network 5 a communication data connection with destination device according to its destination address (e.g., IP address) and using an encryption protocol, such as Secure Sockets Layer (SSL), Transport Layer Security (TLS), etc. For instance, to access the website hosted by the destination device, the fax server may the application layer protocol HTTP over TLS or SSL (e.g., HTTPS). Once the secure communication data connection established, the fax server (encrypts and) transmits data (e.g., electronic messages) to the destination device according to the encryption protocol. In some embodiments, the fax server may establish a secure communication tunnel with the destination device. For instance, the fax server may establish using the IP address or domain name of the destination device, a Virtual Personal Network (VPN) connection with the destination device. Once established, the fax server may transmit the electronic message via the VPN connection. For instance, the fax server may establish a communication data connection with a VPN server through which (e.g., a VPN connection is established in which) the fax server may communicate with the destination device (e.g., using any communication protocol, such as HTTPS). As another example, once the secure communication tunnel is established, the fax server 6 may transmit an e-mail (SMTP message) with the fax message attached, as described herein.

As described thus far, the fax server 6 may be configured to establish a communication data connection with one or more destination devices in order to route (or forward) incoming fax transmissions. In another embodiment, the fax server may receive incoming fax transmissions through one or more communication data connections with a source device, such as laptop 3. For instance, the source device may establish any of the communication data connections with the fax server, as described herein. For example, the source device may access a website hosted by the fax service provider server 6 and transmit an incoming fax according to any Application Layer Protocol, such as HTTPS.

The server includes a communication interface 20, one or more processors 21, and a non-transitory machine-readable storage medium 22. Examples of non-transitory machine-readable storage medium may include read-only memory, random-access memory, CD-ROMs, DVDs, magnetic tape, optical data storage devices, flash memory devices, and phase change memory. Although illustrated as being contained within the server 6, one or more of the components may be a part of separate electronic devices, such as the medium 22 being a separate data storage device. As shown, the non-transitory machine-readable storage medium has stored therein a fax service provider software program (or fax software) 23, subscriber data 25, and auditing data 26. The fax software includes a document processing component 24, which when executed by the one or more processes becomes configured to process an incoming fax transmission to generate a searchable electronic document and to add an electronic signature, as described herein.

The communications interface 20 provides an interface for the fax server 6 to receive an incoming fax transmission (e.g., from the source devices 1-3) and/or transmit fax transmissions (e.g., to the destination devices 7-9) over a network, such as the PSTN 4 and/or the computer network 5. For example, the communication interface is configured to establish a communication link with source device 1 over the PSTN in which an incoming fax is received through a downlink signal, and is configured to establish a communication link with destination device 7 over the PSTN in which a fax is transmitted through an uplink signal. Similarly, the interface is configured to establish a data connection (such as a VPN connection) with one or more destination devices.

In one embodiment, the subscriber data 25 may include information of subscribers of one or more fax services. Specifically, the data may be in the form of a data structure that includes a lookup table having subscriber (e.g., identifying) information, such as the subscriber's name, the subscriber's personal telephone number (which may be associated with a destination device, such as the mobile phone 8), and a subscriber's assigned DID telephone number. In some embodiments, the data structure may include one or more destination addresses to which the fax service provider routes (forwards) incoming fax transmissions that are received for a specific subscriber. For example, a subscriber's destination addresses may include an e-mail address, a (e.g., voice) telephone number, a fax telephone number, an IP address, etc. In one embodiment, the subscriber data may include subscriber settings or preferences, such as which destination address the subscriber wishes incoming fax transmissions to be routed (or forwarded) by the fax system. In another embodiment, the subscriber preferences may indicate what format fax transmissions are to be received by a subscriber. For instance, a subscriber's preferences may indicate that incoming fax transmissions are to be routed in a suitable fax format, such as TIFF, and/or to be routed in another format, such as PDF. In one embodiment, the subscriber preferences may indicate whether the (document processing component 24 of the) fax software is to perform additional (or special) processing operations upon incoming fax transmissions. More about the operations performed by the component 24 is described herein.

In some embodiments, the auditing data 26 may include information regarding fax transmissions that have been received, processed, and/or transmitted (or routed) by the fax service provider server 6. For example, the auditing data may be stored in a data structure that includes information, such as time stamps and document information of incoming fax transmissions. More about the auditing data is described herein.

The processor 21 may include one or more data processing circuits, generically referred to herein as "a processor." The processor may execute the fax software 23 that is (at least partially) stored within memory 22 to perform some or ail of the fax service provider operations and methods that are described herein, for one or more of the embodiments related to the server 6. In particular, the fax software (e.g., which when executed by the processor 21) is capable of processing fax transmissions destined for subscribers of one or more fax services. For instance, the fax software is configured to receive (e.g., via the communication interface of the fax server) an incoming fax transmission and an outbound address to which the fax transmission is being transmitted by a source device, and is configured to determine how to route a received incoming fax transmission. For instance, when the incoming fax transmission is over the PSTN, the outbound address may be the DID telephone number to which the source device is sending the fax. In one embodiment, the determination of how to route the fax is based on whether the outbound address is associated with a subscriber. If so, the fax software may determine how to route the fax transmission based on subscriber preferences in the subscriber data 25. More about determining how to route fax transmissions is described herein.

In one embodiment, the document processing component 24 is configured to process a received fax transmission. For instance, the received fax transmission may be an electronic message (e.g., via e-mail, communication data connection, etc.). that includes a (e.g., first) searchable electronic document in any format, such as a word processing format, a spreadsheet format, or a presentation format, as described herein. The component generates another (e.g., second) searchable electronic document (e.g., in another file format that is different than the first document's file format) from the first searchable electronic document. For instance, the second searchable electronic document may be a searchable PDF document, which is generated from a word processing document. In one embodiment, the generated second searchable electronic document may preserve (or retain) ail formatting of the first document (e.g., font, font size, font color, spacing, margins, alignment, etc.). For instance, the generated searchable PDF document may include embedded fonts from the first searchable electronic document (e.g., word processing document). The component adds an electronic signature to authenticate the second document, and the second document is transmitted to a destination device. Thus, the routed fax transmission remains a searchable document and includes an electronic signature that authenticates the transmission of the document. This is in contrast to conventional fax transmissions, which are transmitted in non-searchable fax formats, such as TIFFs. More about the operations performed by the component is described herein.

Figure 3:
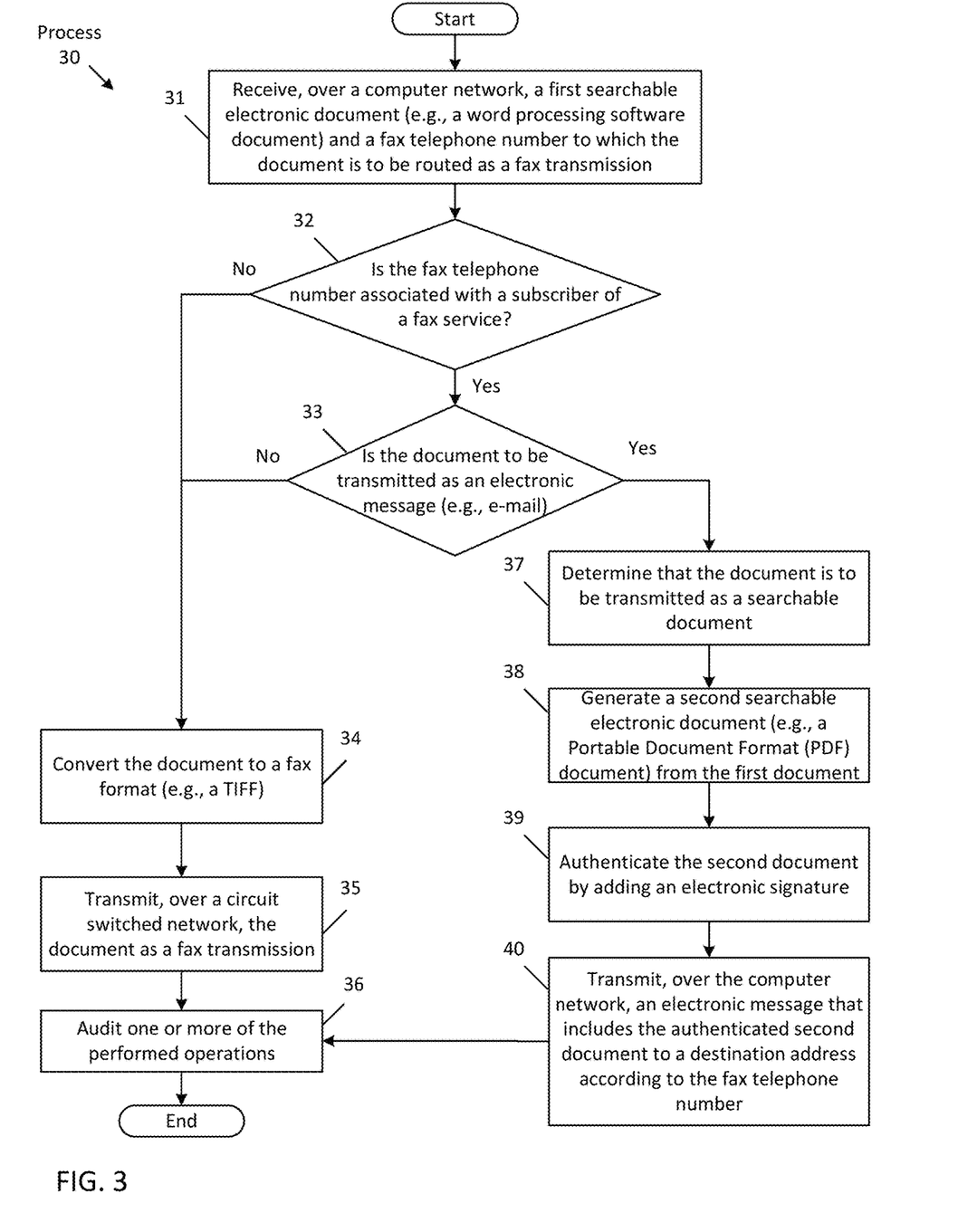
FIG. 3 is a flowchart of one embodiment of a process to perform processing upon a fax transmission, according to some embodiments.

FIG. 3 is a flowchart of one embodiment of a process 30 to perform processing upon a fax transmission, according to some embodiments. This process may be performed by the (e.g., fax service provider software program 23 of the) fax service provider server 6 of the fax system 10 illustrated in FIG. 1. For example, the document processing component 24 of the fax software 32 that is being executed by one or more processors of the server may perform at least some of the operations described herein.

The process 30 begins by the fax server 6 receiving, over a computer network (e.g., network 5), a (e.g., first) searchable electronic document (or first document) and a fax telephone number to which the first document is to be routed as a fax transmission (at block 31). Specifically, the fax server 6 may receive an electronic message that includes the document as an attachment and includes an outbound address to which the document is being transmitted (e.g., by a source device), where the outbound address may include the fax telephone number. In one embodiment, the first searchable electronic document may be a searchable electronic document in any format, such as a word processing format, PDF, etc., as described herein. Such a document may include (embedded) formatting (e.g., as metadata), such as font selection, font size, font color, spacing, margins, alignment, images overlaid on the document, etc. In some embodiments, the outbound address may be data (e.g., metadata) that is a part of (e.g., a header of one or more data packets that include) the electronic message. For example, when the electronic message is an e-mail, the outbound address is the e-mail address to which the e-mail is being sent. In this case, the fax software 23 may receive the e-mail that has been routed to the fax server based on the e-mail's domain address. As described herein, the user name of the e-mail address may include the fax telephone number (e.g., as an outbound address). As described herein, the first searchable electronic document may be received via a communication data connection that is (e.g., previously) established (via an API) between a source device and the fax server. In one embodiment, the fax telephone number may be received based on the established connection. For instance, the fax telephone number may be a part of a domain of a URL that is used to establish a connection over a file transfer protocol, such as HTTPS. As another example, the fax telephone number may be a part of one or more data packets (e.g., in a header of the packets) that are transmitted across the connection.

The server determines if the fax telephone number (or the outbound address) is associated with a subscriber of one or more fax services (at decision block 32). For example, the fax software 23 may determine whether the fax telephone number is associated with a subscriber of the fax service. In one embodiment, the fax software may search the subscriber data 25 by performing a table lookup using the fax telephone number, for example. In particular, the software may determine whether subscriber information (e.g., a subscriber's name) is associated with the fax telephone number. In one embodiment, the software may determine whether the subscriber is an "existing" subscriber. For instance, an existing subscriber may be a subscriber who has an existing subscription (e.g., whose fees are paid up-to-date), or a subscriber whose subscription hasn't expired. In response to the fax telephone number not being associated with a (e.g., existing) subscriber, the server converts the document to a fax suitable format, such as TIFF (at block 34). The server transmits the document, over a circuit switched network such as PSTN 4, as a fax transmission (at block 35). For instance, the fax software (through the communication interface 20, places an outgoing call to the fax telephone number and transmits the fax formatted document over the outgoing call, once it is answered (e.g., by a destination device, such as fax machine 7).

The server audits one or more of the performed operations (at block 36). In particular, the server may audit the operations by storing data (e.g., in the auditing data 26) regarding the reception of the electronic document, processing of the document, and/or transmission of the document. For example, the server may store a reception time stamp at which the electronic document is received, processing information, such as information indicating that the electronic document was converted into a fax format (at a time stamp at which the conversion occurred), and a transmission time stamp at which the fax transmission was transmitted over the circuit switched network. In one embodiment, other information may be stored as well. More about the auditing data is described herein.

If, however, the fax telephone number is associated with a subscriber, the fax server determines whether to transmit the document as an electronic message (e.g., e-mail) over the computer network 5 based on the fax telephone number (at decision block 33). In particular, the server determines whether the document is to be transmitted as the electronic message (e.g., over a communication data connection, such as a VPN connection, as an e-mail, etc.) or whether the document is to be transmitted as audio-frequency tones via the PSTN, based on the subscription data 25. In particular, the server determines whether preferences of the (e.g., existing) subscriber that is associated with that fax telephone number indicates how incoming fax transmissions are to be routed by the fax server. If the subscriber preferences indicate that incoming fax transmissions are to be routed as a fax over the PSTN, the fax server proceeds to convert the document to the fax suitable format, as described in block 34. In another embodiment, if the subscriber preferences do not indicate one way or the other, the fax server may automatically proceed to block 34.

Otherwise, the fax server determines that the document is to be transmitted as a searchable electronic document (at block 37). Specifically, the fax server may make this determination based on subscriber preferences in the subscriber data 25. For instance, the fax software may determine whether the subscriber has elected for the incoming fax transmission to be processed to produce a searchable document that is to be routed to (e.g., a destination address of) the subscriber. Such an election may be based on whether the subscriber has paid additional subscription fees to the fax service provider to perform this additional processing.

The fax server generates a second searchable electronic document (e.g., second document) from the received first searchable electronic document (at block 38). For instance, the document processing component 24 may convert the first document (which may be in any searchable format, such as a word processing format, a spreadsheet format, etc.) into a second searchable electronic document. In one embodiment, the second document may be in a same or different file format than the first document. For example, when the first document is a word processing document, the second document may be a searchable PDF document. In one embodiment, the document processing component may use any known conversion software application to convert the first document into the second document. For example, the document processing component may use any type of PDF conversion software to convert the document into a searchable PDF document.

In one embodiment, the second document may retain some or all characteristics of the first document. For example, the second document may include a same (or different) number of pages as the first document. As described herein, the second document may retain some or all of the formatting of the original searchable electronic document, such as font selection, font size, font color, spacing, etc. As another example, the formatting may be retained as metadata, such as for a PDF document that may retain at least some metadata (e.g., in Extensible Markup Language (XML) format) of the original document, such as author, file name, date, and other settings/preferences.

The fax server authenticates the second document by adding an electronic signature to the document (at block 39). The electronic signature may include text (and/or images) that is added to at least a portion one or more pages of the second searchable electronic document (e.g., within a margin). In one embodiment, once the electronic signature is added, it may be permanent on the document, such that the signature may not be editable or manipulated by a user through the use of a document viewing software application. In one embodiment, the electronic signature authenticates the second document by including information regarding the incoming fax transmission. For example, the signature may include at least one of a (e.g., reception) timestamp of when the first searchable electronic document was received by the fax server, a number of pages of the second document, source device information (e.g., a source device's inbound address, such as an inbound (fax) telephone number, an inbound e-mail address, etc.). In one embodiment, the electronic signature may include at least some of the same information that is included in a fax header of a fax that is transmitted as audio-frequency tones, as described herein. In another embodiment, the electronic signature may resemble the fax header, such as being positioned along a header portion of the second document.

The fax server transmits, over the computer network, an electronic message that includes the authenticated searchable document to a destination device according to the fax telephone number (at block 40). In particular, the fax software may perform a table lookup into the subscriber data 25 to determine one or more destination addresses to which a subscriber of the fax telephone number wishes fax transmissions to be routed. For instance, when the destination address is an e-mail address, the fax software transmits an e-mail (as the electronic message) that includes the authenticated searchable document to the subscriber's (e.g., personal, business, etc.) e-mail address. As another example, when the destination address is a (e.g., mobile) telephone number, the fax software may transmit the authenticated document in a SMS message and/or a Multimedia Messaging Service (MMS) message. In another aspect, the electronic message may be transmitted via a communication data connection, as described herein. In this case, a determined destination address may be a server's (or computer's) domain name or address (e.g., IP address) and the fax software may establish, over the computer network, the connection with the destination device according to the IP address. Once established, the fax software transmits the electronic message via the connection. In one embodiment, the fax software may transmit the message according to an encryption protocol, such as TLS protocol as described herein.

The server audits one or more of the performed operations at block 36, as described herein. For instance, the server may (determine and) store information regarding the reception of the first searchable electronic document (e.g., a reception time stamp), and the generation and transmission of the second searchable electronic document.

Some embodiments perform variations of the process 30. For example, the specific operations of the process 30 may not be performed in the exact order shown and described. The specific operations may not be performed in one continuous series of operations, some operations may be omitted, and different specific operations may be performed in different embodiments. For instance, rather than determining that the document is to be transmitted as a searchable document at block 37, the fax server may determine that the document is to be transmitted as tones via the PSTN. In one embodiment, this determination may be based on user preferences associated with the subscriber stored in the subscriber data 25. In this case, the fax server may be configured to transmit the document as an electronic message to the (e.g., destination address of the) subscriber. Alternatively, the fax server may convert the document into the fax format and transmit the fax over the PSTN.

In another embodiment, the server 6 may perform at least some different operations in response to determining that the document is not to be transmitted as a searchable document. For instance, rather than determining that the document is to be transmitted as a searchable document at block 37, the server may determine that no additional document processing is to be performed to convert the document into a (e.g., another) searchable document. For instance, the subscriber preferences may indicate that special processing is not to be performed (e.g., by subscriber election, by non-payment of subscriber, etc.). In this case, the device may omit operations performed in block 38 and/or omit operations performed in block 39, and proceed to transmit an electronic message that includes the document.

As described thus far, the document received for fax transmission is a searchable electronic document that is received over the computer network 4. In another embodiment, the document may be an incoming fax that is received in a fax format over the PSTN. In that case, to generate the second searchable electronic document at block 38, the fax server may perform OCR software, as described herein.

In another embodiment, at least some of the operations described herein may be performed in any order and/or multiple times throughout the process 30. For example, rather than (or in addition to) auditing the performed operations after transmission of the fax transmission, the server may audit the operations as they are performed. As an example, upon receiving the first searchable electronic document, the server may determine and store a reception time stamp that indicates the time at which the document was received. At or after each step the server may store information regarding the operation(s) performed at that step.

Figure 4:
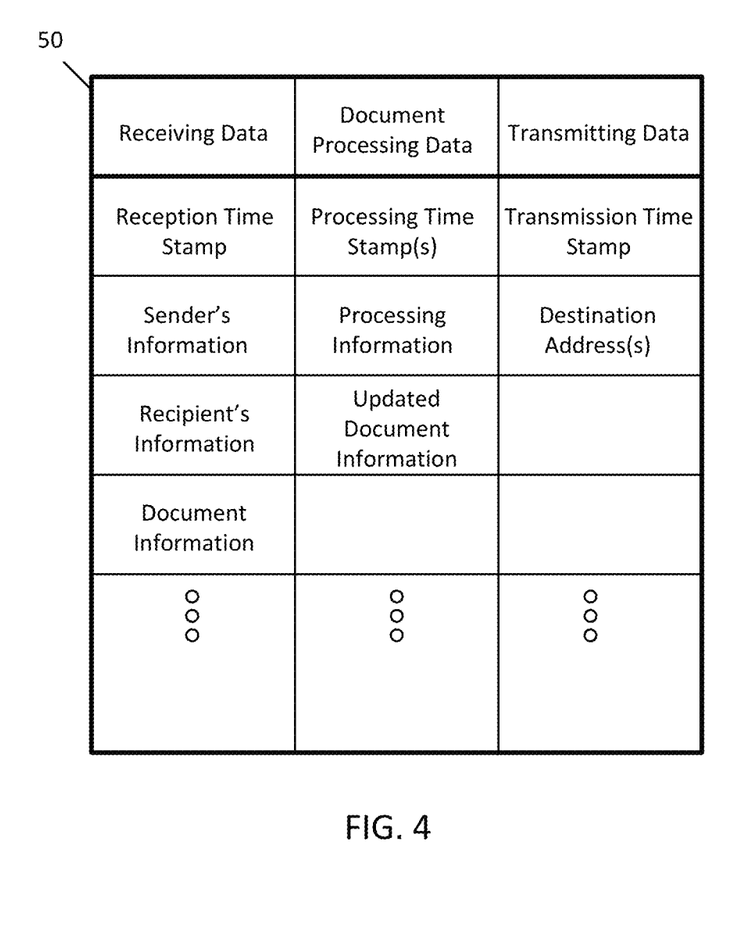
FIG. 4 illustrates a data structure that includes auditing data associated with the processing of the fax transmission, according to some embodiments.

FIG. 4 illustrates a data structure 50 that includes auditing data 26 associated with the processing of the fax transmission, according to some embodiments. Specifically, the data structure includes a table that includes data regarding an incoming fax transmission to the fax server 6. As shown, the table includes receiving data, document processing data, and transmitting data. The receiving data includes information regarding a received incoming fax transmission, which includes a reception time stamp that indicates a time at which the fax transmission was received, sender's (or source) information, such as a phone number or e-mail address of the sender, recipient's information that may include a fax telephone number to which the incoming fax transmission is being sent, and document information that includes information regarding the incoming fax transmission, such as the number of pages, document type, etc. In one embodiment, the server 6 may determine and store the receiving data upon receiving the incoming fax.

The document processing data may include information regarding when and how an incoming fax transmission is processed by the fax server. For example, the processing data may include processing time stamp(s) that indicate when a document is processed, processing information that indicates how the document is processed (e.g., indicating that a first searchable electronic document is converted into a second searchable electronic document and what format the document is converted from and into, etc.), and updated document information (e.g., indicating that the processed document's page size changed from five pages to six pages, etc.). The transmitting data may include information regarding the transmission (or routing) of the fax transmission, which may include a transmission time stamp and destination address(es) to which the fax has been routed. In one embodiment, more or less information may be stored within the data structure.

An embodiment may be an article of manufacture in which a non-transitory machine-readable storage medium has stored thereon instructions which program one or more data processing components (generically referred to here as "a processor") to perform the operations described above. For example, in one embodiment, the above-described process 30 of FIG. 3 may be performed by the processor 21 that is executing instructions stored in the non-transitory machine-readable storage medium. The non-transitory machine readable storage medium may be a part of the fax server 6, as described herein. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least one of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a programmed processor of a fax service provider server, the method comprising:
   receiving, over a computer network and from a source device, a first searchable electronic document and a fax telephone number to which the document is to be routed as a fax transmission;
   determining that the first searchable electronic document is to be transmitted as an electronic message over the computer network based on the fax telephone number;
   generating a second searchable electronic document from the first searchable electronic document, the second searchable electronic document having all searchable text and image data of the first searchable electronic document;
   adding an electronic signature to the second searchable electronic document, wherein the electronic signature i) authenticates said all searchable text and image data that is within the second searchable electronic document and ii) includes at least one of a timestamp of when the first searchable electronic document was received, a number of pages of the second searchable electronic document, and source device information; and
   transmitting, over the computer network, an electronic message that includes the second searchable document to a destination address according to the fax telephone number.

2. The method of claim 1, wherein the first searchable electronic document is in a first file format, wherein generating the second searchable electronic document comprises converting the first searchable electronic document from the first file format into a second file format that is searchable and is different than the first file format.

3. The method of claim 2,
   wherein the first file format is one of a word processing format, a spreadsheet format, or a presentation format, and
   wherein the second file format is a searchable Portable Document Format (PDF).

4. The method of claim 1, wherein the second searchable electronic document retains all formatting of the first searchable electronic document.

5. The method of claim 1, wherein the destination address is an Internet Protocol (IP) address or a domain name of a destination device, wherein transmitting the electronic message comprises
   establishing, over the computer network and using the IP address or the domain name, a Virtual Personal Network (VPN) connection with the destination device; and
   transmitting the electronic message to the destination device via the VPN connection.

6. The method of claim 1, wherein transmitting the electronic message comprises:
   establishing, over the computer network, a communication data connection with a destination device according to the destination address; and
   transmitting the electronic message over the communication data connection according to an encryption protocol, wherein the encryption protocol comprises one of a Secure Sockets Layer (SSL) protocol or a Transport Layer Security (TLS) protocol.

7. The method of claim 1,
   wherein the electronic message is an e-mail when the destination address is an e-mail address, and
   wherein the electronic message is a Multimedia Messaging Service (MMS) message when the destination address is a telephone number.

8. The method of claim 1 further comprising determining whether the fax telephone number is associated with a subscriber of a fax service, wherein determining that the first searchable electronic document is to be transmitted as the electronic message is in response to determining that the fax telephone number is associated with the subscriber.

9. The method of claim 8, wherein the method further comprises, in response to determining that the fax telephone number is not associated with the subscriber,
   converting the first searchable electronic document into a document in a fax format;
   placing an outgoing call to the fax telephone number; and
   transmitting the document over the outgoing call using audio-frequency tones.

10. The method of claim 8, wherein the fax telephone number is an identifier that is unique to the subscriber.

11. The method of claim 1 further comprising auditing one or more of the performed operations to store information regarding the reception of the first searchable electronic document, and the generation and transmission of the second searchable electronic document.

12. A method performed by a programmed processor of a fax service provider server, the method comprising:
   receiving, over a computer network and from a source device, a first searchable electronic document for fax transmission to a fax telephone number;
   determining whether the first searchable electronic document is to be transmitted as a fax or as an electronic message based on the fax telephone number;
   in response to determining that the first searchable electronic document is to be transmitted as an electronic message,
      generating a second searchable electronic document from the first searchable electronic document, the second searchable electronic document having all searchable text and image data of the first searchable electronic document;
      adding an electronic signature to the second searchable electronic document, wherein the electronic signature i) authenticates said all searchable text and image data that is within the second searchable electronic document and ii) includes at least one of a timestamp of when the first searchable electronic document was received, a number of pages of the second searchable electronic document, and source device information; and
      transmitting, over the computer network, the electronic message that includes the second searchable electronic document to a destination address according to the fax telephone number.

13. The method of claim 12, wherein the first searchable electronic document is in a first file format, wherein generating the second searchable electronic document comprises converting the first searchable electronic document from the first file format into a second file format that is searchable and is different than the first file format.

14. The method of claim 13,
   wherein the first file format is one of a word processing format, a spreadsheet format, or a presentation format,
   wherein the second file format is a searchable Portable Document Format (PDF).

15. The method of claim 12, wherein the PDF document retains all formatting of the word processing software document.

16. The method of claim 12, wherein the destination address is an Internet Protocol (IP) address or a domain name of a destination address, wherein transmitting the electronic message comprises
   establishing, over the computer network and using the IP address or the domain name, a Virtual Personal Network (VPN) connection with the destination device; and
   transmitting the electronic message via the VPN connection.

17. The method of claim 12, wherein transmitting the electronic message comprises:
   establishing, over the computer network, a communication data connection with a destination device that is associated with the destination address, and
   transmitting the electronic message over the communication data connection according to an encryption protocol, wherein the encryption protocol comprises one of a Secure Sockets Layer (SSL) protocol or a Transport Layer Security (TLS) protocol.

18. A
   non-transitory machine-readable storage medium having instructions stored therein which when executed by a fax service provider server causes the fax service provider server to
      receive, over a computer network and from a source device, a first searchable electronic document and a fax telephone number to which the document is to be routed as a fax transmission;
      determine that the first searchable electronic document is to be transmitted as an electronic message over the computer network based on the fax telephone number;
      generate a second searchable electronic document from the first searchable electronic document, the second searchable electronic document having all searchable text and image data of the first searchable electronic document;
      add an electronic signature to the second searchable electronic document, wherein the electronic signature i) authenticates said all searchable text and image data that is within the second searchable electronic document and ii) includes at least one of a timestamp of when the first searchable electronic document was received, a number of pages of the second searchable electronic document, and source device information; and
      transmit, over the computer network, an electronic message that includes the second searchable electronic document to a destination address according to the fax telephone number.

19. The non-transitory machine-readable storage medium of claim 18, wherein the first searchable electronic document is in a first file format, wherein generating the second searchable electronic document comprises converting the first searchable electronic document from the first file format into a second file format that is searchable and is different from the first file format.

20. The non-transitory machine-readable storage medium of claim 19,
   wherein first file format is one of a word processing format, a spreadsheet format, or a presentation format, and
   wherein the second file format is a searchable Portable Document Format (PDF).

21. The non-transitory machine-readable storage medium of claim 18, wherein the second searchable electronic document retains all formatting of the first searchable electronic document.

22. The non-transitory machine-readable storage medium of claim 18, wherein the destination address is an Internet Protocol (IP) address or a domain name of a destination device, wherein the instructions to transmit the electronic message comprises instructions to
   establish, over the computer network and using the IP address or the domain name, a Virtual Personal Network (VPN) connection with the destination device; and
   transmitting the electronic message via the VPN connection.

23. The non-transitory machine-readable storage medium of claim 18, wherein the instructions to transmit the electronic message comprises instructions to:

establish, over the computer network and using the destination address, a communication data connection with a destination device that is associated with the destination address; and transmit the electronic message over the communication data connection according to an encryption protocol, wherein the encryption protocol comprises one of a Secure Sockets Layer (SSL) protocol or a Transport Layer Security (TLS) protocol.

24. The non-transitory machine-readable storage medium of claim 18, wherein the electronic message is an e-mail when the destination address is an e-mail address, and wherein the electronic message is a Multimedia Messaging Service (MMS) message when the destination address is a telephone number.

25. The non-transitory machine-readable storage medium of claim 18, wherein the non-transitory machine-readable storage medium comprises further instructions to audit one or more of the performed operations to store information regarding the reception of the first searchable electronic document, and the generation and transmission of the second searchable electronic document.

* * * * *